US005748637A

United States Patent [19]

Joffe et al.

[11] Patent Number: 5,748,637
[45] Date of Patent: *May 5, 1998

[54] DTMF SIGNALING ON FOUR-WIRE SWITCHED 56 KBPS LINES

[75] Inventors: Daniel M. Joffe, North Plainfield; Donald C. Panek, Jr., East Brunswick, both of N.J.

[73] Assignee: Integrated Network Corporation, Bridgewater, N.J.

[*] Notice: The term of this patent shall not extend beyond the expiration date of Pat. No. 5,457,690.

[21] Appl. No.: 540,305

[22] Filed: Oct. 6, 1995

Related U.S. Application Data

[63] Continuation of Ser. No. 176,933, Jan. 3, 1994, Pat. No. 5,457,690.

[51] Int. Cl.$^6$ ............................. H04J 3/06; H04M 3/22
[52] U.S. Cl. ................... 370/516; 370/522; 379/257; 375/371
[58] Field of Search ............................. 370/100.1, 105.1, 370/110.1, 110.2, 110.3, 503, 516, 517, 522, 526; 379/88, 257, 418; 375/371

[56] References Cited

U.S. PATENT DOCUMENTS

| | | | |
|---|---|---|---|
| 4,125,745 | 11/1978 | Steidl | 179/15 BY |
| 4,571,722 | 2/1986 | Bingham et al. | 370/106 |
| 4,890,304 | 12/1989 | Annamalai | 375/114 |
| 4,945,533 | 7/1990 | Schroeder et al. | 370/32.1 |
| 4,995,076 | 2/1991 | Joffe et al. | 379/257 |
| 5,014,307 | 5/1991 | Joffe et al. | 379/410 |
| 5,060,259 | 10/1991 | Joffe et al. | 379/257 |
| 5,123,009 | 6/1992 | Winter | 370/100.1 |
| 5,127,004 | 6/1992 | Leniham et al. | 379/67 |
| 5,128,945 | 7/1992 | Enns et al. | 371/37.1 |
| 5,144,624 | 9/1992 | Sharper et al. | 370/110.1 |
| 5,327,433 | 7/1994 | Hall | 370/100.1 |
| 5,400,369 | 3/1995 | Ikemura | 370/106 |

OTHER PUBLICATIONS

Technical Reference entitled, "Special Access Connections To The AT&T Communications Network For New Service Applications," pp. 1–38, Oct. 1985.

Technical Reference entitled, "Special Access Connections To The AT&T Network," pp. I–1 through III–16, Apr. 1990.

*Primary Examiner*—Douglas W. Olms
*Assistant Examiner*—Min Jung
*Attorney, Agent, or Firm*—Hamilton, Brook, Smith & Reynolds, P.C.

[57] ABSTRACT

Dual tone multi-frequency (DTMF) address signaling on four-wire switched 56 kilobits per second (Kbps) service lines is obtained by determining the proper byte boundary information. An iterative learning process is used with an existing digital switching network having a call progress indication capability. The learning process steps through each possible byte alignment until the call progress protocol indicates that a proper byte alignment has been achieved. Once a proper byte alignment has been determined, that byte alignment information is retained for subsequent use, thus avoiding the need to repeat the learning process.

29 Claims, 4 Drawing Sheets

DTMF SIGNALING ON FOUR-WIRE SWITCHED 56 KBPS LINES

RELATED APPLICATION

This application is a continuation of application Ser. No. 08/176,933 filed Jan. 3, 1994, U.S. Pat. No. 5,457,690 which is incorporated herein by reference in its entirety.

BACKGROUND OF THE INVENTION

Four-wire (4W) switched 56 Kbps service affords a synchronous 56 kilobit per second (Kbps) connection to a switched digital communication network from Customer Premises Equipment (CPE). This network consists of channels in which voice and/or data information is transmitted in the form of time division multiplexed signals at the rate of 64 Kbps. The information for each channel is divided up into bytes/words consisting of eight bits of information.

The bytes are, for example, multiplexed into frames of twenty-four eight-bit bytes over a T1 carrier having 24 trunk lines. The digital signal is multiplexed as one byte per trunk, plus a framing bit for each frame of the digital signal. The framing bit is used to identify where the byte allocated to each of the 24 trunks are located on the T1 carrier. The framing bit has a pattern which takes twelve frames to repeat. These twelve frames, numbered one through twelve, are termed a superframe.

Normally all eight bits of each byte transmitted during a frame contain encoded voice or digital data information. However, in every sixth frame the least significant bit is replaced with a signalling bit by, for example, the digital switch. These signalling bits are used between the digital switch and the CPE to indicate to the CPE the progress of communication during a call setup period.

Thus, the sixth and twelfth frames for each superframe include a signalling bit in the eight bit position of each of the twenty-four bytes. Within this network, the presence of the byte boundaries yields the capability to send and receive eight-bit bytes containing digitized representations of dual tone multi-frequency (DTMF) address signaling as well as voice and 56 Kbps data.

Although the network depends on aligned bytes for DTMF signalling, the 4W switched 56 CPE only transmits a synchronous bit stream without a byte alignment. The lack of byte boundary information at the switched 56 Kbps connection to the network has precluded the sending of DTMF addressing (dialing) signals. As such, all four-wire switched 56 Kbps connections are currently using dial pulse signaling.

SUMMARY OF THE INVENTION

A preferred embodiment of the invention overcomes the lack of byte boundary information by determining the proper byte boundary through an iterative process with existing apparatus in the central office. A preferred iterative process requires no changes to existing central office control programs. Once this byte boundary determination has been made, DTMF signals sent by the switched 56 station are correctly interpreted by the DTMF receivers in the central office.

The calling node units of the switched station send the DTMF digits as digitally encoded representations of the DTMF signals. Although the switched station cannot access all of the 64 Kbps stream available in the central office switch, the inaccessible bit, bit 8, is the least significant bit of the digitized representation of the DTMF signal. As such, the inaccessibility of that bit is not significant.

Preferred embodiments of the invention operate in a communication system that includes a digital network having a byte alignment and a call progress capability and includes a calling node at a service unit of a switched 56 station which lacks a byte alignment. In particular, the communication system is a telephone communication system having a switched digital telephone network. The service units are preferably switched service units such as Channel Service Units (CSU)/Digital Service Units (DSU). Even more particularly, the service unit is a four-wire switched 56 Kbps service having a bitwise synchronous 56 Kbps connection to a switched digital network having 64 Kbps channels.

A preferred method and apparatus of the invention interconnects the calling node units lacking byte boundary information to a remote called node in the system via the digital network. The calling node unit is first interconnected with the digital network. Then the byte alignment of the digital network is determined in an iterative learning sequence using the call progress capability of the digital network. After the byte alignment of the digital network is determined, the interconnection to the remote called node is completed using the determined byte alignment.

The byte alignment is determined by iteratively selecting a candidate byte alignment at a selected bit position, transmitting a digital representation of a DTMF signal having the candidate byte alignment and detecting the presence or absence of a call progress response from the digital network. More particularly, an arbitrary bit position is initially selected and sequential bit positions are selected on subsequent iterations. The DTMF signal preferably includes a subset of the remote called node addressing signals, which can include network access signals. The presence of a call progress response is detected by recognizing a transition in signals returned from the digital network. The presence of a call progress response indicates that the candidate byte alignment is the byte alignment of the digital network. The byte alignment is retained in memory of the calling node units or subsequent use during the current call or in completing future interconnections.

The ability to use DTMF signaling affords much faster call set-up time, as compared to dial pulse signaling. For example, at 10 pulses per second, with a 600 ms inter-digit time, it takes about 11 seconds to pulse dial a 10 digit number. Using DTMF signaling with a 100 ms duration and a 100 ms spacing, the same number takes about 2 seconds to tone dial. This high-speed call set-up, while valuable in general, is of particular value when multiple calls must be dialed, or when the call must be completed quickly, as in the case of switched backup of dedicated lines.

BRIEF DESCRIPTION OF THE DRAWINGS

The above and other features of the invention, including various novel details of construction and combination of parts, will now be more particularly described with reference to the accompanying drawings and pointed out in the claims. It will be understood that the particular byte alignment system embodying the invention is shown by way of illustration only and not as a limitation of the invention. The principles and features of this invention may be employed in varied and numerous embodiments without departing from the scope of the invention.

DETAILED DESCRIPTION OF A PREFERRED EMBODIMENT OF THE INVENTION

Figure 1:
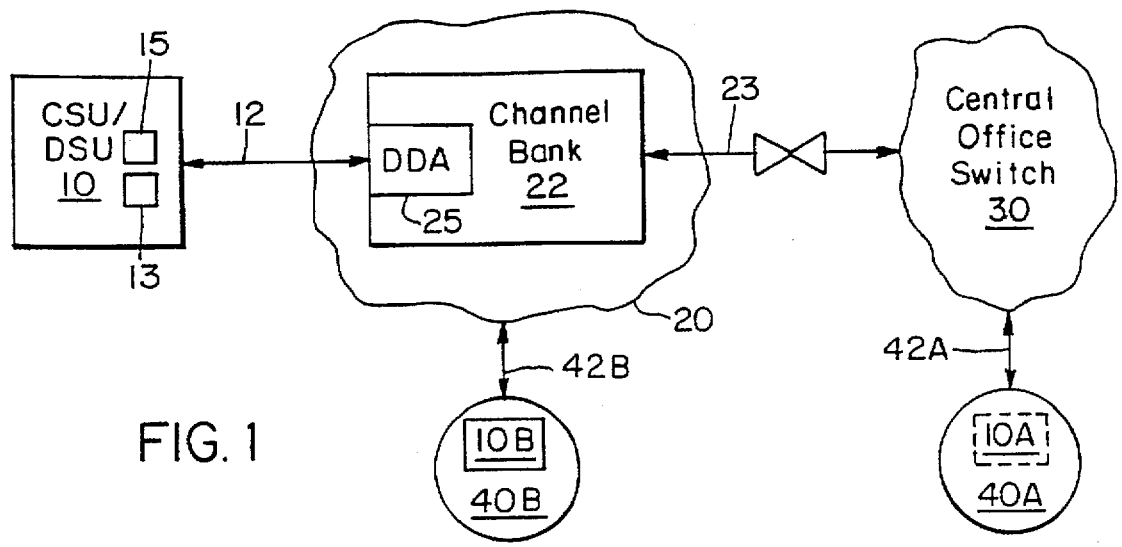
FIG. 1 is a block diagram illustrating a switched 56 switched channel data service unit in the context of a switched digital telephone network.

FIG. 1 is a block diagram of a switched 56 Kbps switched channel CSU/DSU 10 in the context of a switched digital telephone network 20. The CSU/DSU 10 contains memory 13 and a DTMF sequence generator 15 and is interconnected to a channel bank 22 in the network 20 by a four-wire switched 56 Kbps line 12. The channel bank 22 is linked to the four-wire local switched 56 Kbps line 12A via a direct digital access (DDA)/office channel unit (OCU) 25. At the telephone company office, the DDA 25 is located in a digital channel bank 22 and is typically connected directly to a central office switch 30 via one trunk line of a T1 carrier 23 and from the central office switch 30 to a called node 40A via a local loop 42A. The called node 40A can have a respective CSU/DSU 10A (shown in phantom), but that is not required. Indeed, the called node 40A can be connected to a Plain Old Telephone Service (POTS) line. In addition, a called node 40B having a CSU/DSU 10B can be connected to the channel bank 22 via a local loop 42B. Alternatively, the DDA 25 may be connected to the digital switch through a direct access and cross-connect switch (DACS) or a DS-0 cross connection. In a preferred embodiment, the DDA 25 must have call progress indication (CPI) capability as described in U.S. Pat. Nos. 4,995,076 and 5,060,259, entitled "Call Progress Capability For a Switched Channel Data Service Unit," the teachings of which are incorporated herein by reference.

CPI is provided within the digital switching network 20, by using certain tones called "call progress tones" (CPT) to indicate the progress of communication during a call set-up period. Presently, in communication between the switching network and the customer's data terminal equipment (DTE), the state of A and B signaling bits is used to indicate "on-hook" or "off-hook" conditions. These signaling bits are found in the eighth bit of signaling frames (every sixth frame) of the network T1 carrier. (See A.T.T. Pub. 43801, "Digital Channel Bank Requirements and Objectives," November 1982).

When the signaling bits indicate an "on-hook" condition, a control mode idle (CMI) bit pattern is continuously transmitted from the DDA 25 of the network system to the DSU 10. In accordance with a call progress protocol described in U.S. Pat. Nos. 4,995,076 and 5,060,259, two types of "on-hook" signals are generated. The first "on-hook" signal generated is the CMI signal which signifies an "on-hook" condition with no tone present. The second "on-hook" signal generated is called an alternative (ALT) signal, which signifies an "on-hook" condition with tones present.

Figure 2:
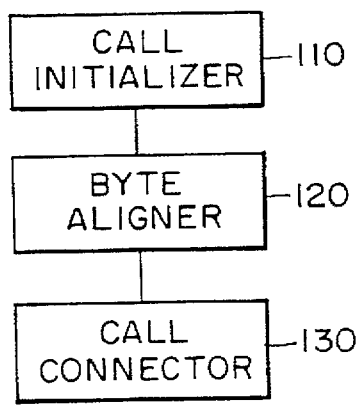
FIG. 2 is a block diagram of a preferred embodiment of the apparatus of the invention.

FIG. 2 is a block diagram of a preferred embodiment of the invention. As illustrated, there are three primary function blocks in a preferred embodiment of the invention. A call initializer 110 in the CSU/DSU 10 interconnects the switched service CSU/DSU 10 with the switched digital telephone network 20. A byte aligner 120 in the CSU/DSU 10 determines the byte alignment of the switched digital telephone network 20 using the CPI capability. A call connector 130 in the CSU/DSU 10 completes the call to the remote called node 40A,40B using the byte alignment determined by the byte aligner 120. In a preferred embodiment of the invention, the call initializer 110, the byte aligner 120 and the call connector 130 are software routines. However, any or all of the blocks may be embodied in one or more hardware or firmware devices or combinations of hardware, software, and firmware.

Figure 3:
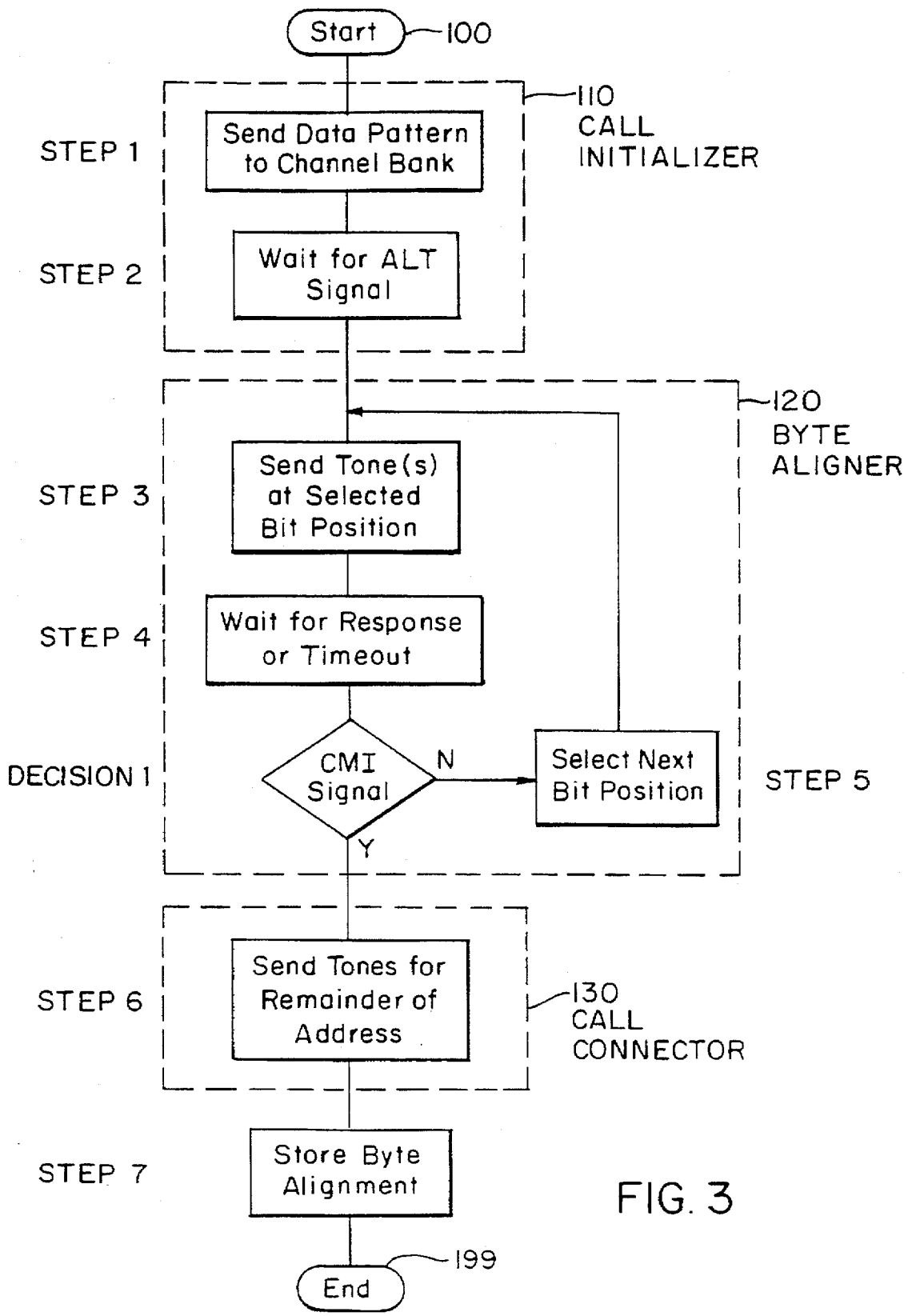
FIG. 3 is a flowchart illustrating a preferred method of the invention.

A preferred embodiment of the invention will now be described with reference to the flowchart of FIG. 3, where the interrelationships between the steps and the blocks of FIG. 2 are indicated in phantom. It is assumed that the CSU/DSU 10 shown in FIG. 1 is idle. In this case, the CSU/DSU 10 is both sending and receiving the idle indication CMI.

When the CSU/DSU 10 initiates a call, a data pattern is transmitted from the CSU/DSU 10 toward the DDA 25 at step 1. This data pattern is typically, but not limited to, a mark hold (MH) pattern (i.e., all ones). If the called node 40A is accessed via the central office switch 30, the central office switch 30 receives the MH pattern and in response transmits a dial tone to the DDA 25. If the called node 40B is connected to the switched digital network 20, then dial tone is provided by the network 20 (e.g., the DDA 25). The dial tone is converted by the DDA 25 into ALT codes. The ALT codes generated by DDA 25 and transmitted toward the CSU/DSU 10 indicate an idle condition with the presence of tone. The tone at this point is dial tone. At step 2, the CSU/DSU 10 waits for receipt of the ALT code.

At step 3, a learning sequence mode is entered where the CSU/DSU 10 responds by transmitting toward a called party node 40A,40B the first DTMF digit of the called party's telephone number. This digit is transmitted as a digital signal having, as a byte boundary, an alignment with a selected bit in the signalling/data stream. For the first pass through the learning sequence, the selected bit is an arbitrary bit position. The selected bit may, however, be a predetermined bit position. It is understood that multiple digits in each byte alignment may need to be transmitted. This is required, for example, when dialing in a Centrex® environment where "9" plus the first number must be dialed before dial tone is cleared.

At step 4, the CSU/DSU 10 waits for the cessation of dial tone as indicated by receipt of CMI from the DDA 25. This "wait" period is preferably about one-half second. Variations in the call progress protocol may require different wait period durations. Processing continues to decision 1.

At decision 1, if the expected response (i.e., transition from ALT to CMI) is not received (Branch N) within the time out period, then the CSU/DSU's 10 original assumption for byte alignment was incorrect. At step 5, the CSU/DSU 10 selects the next of the seven possible byte alignments by selecting the next bit and continues to step 6.

Preferably, the learning sequence described above is executed at most seven times to determine the correct byte alignment. The learning sequence is complete as soon as the chosen byte alignment has caused dial tone to stop (e.g., CSU/DSU 10 sees the transition from ALT back to CMI) at decision 1 (Branch Y). At that point processing proceeds to step 6.

Figure 4A:
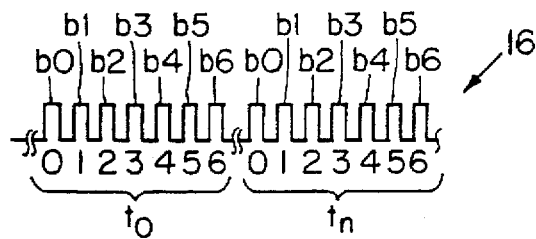
FIGS. 4A–4G illustrate a timing diagram of the process of determining byte alignment of FIG. 3.
Figure 4B:
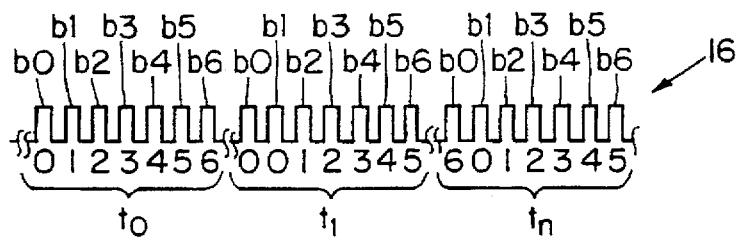
Figure 4C:
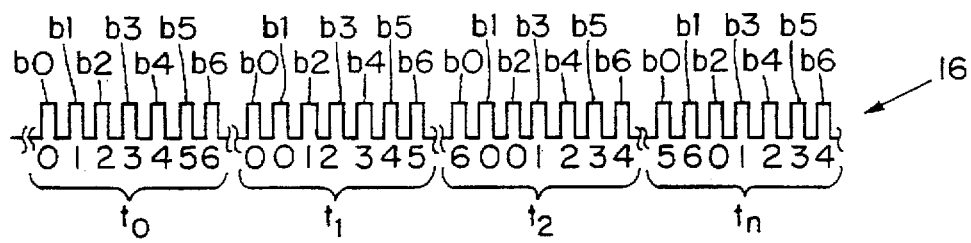
Figure 4D:
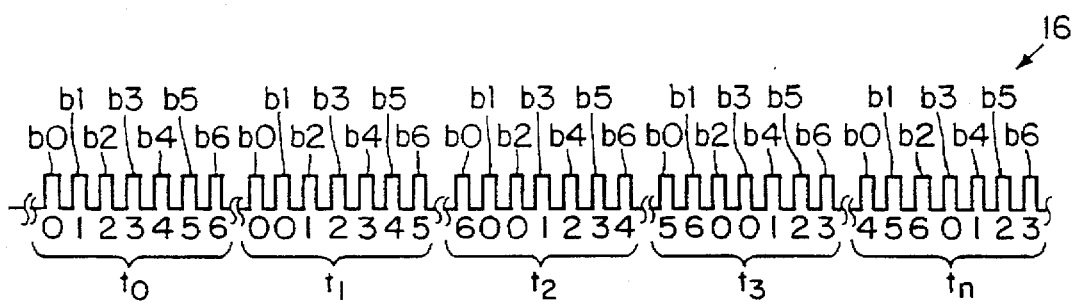
Figure 4E:
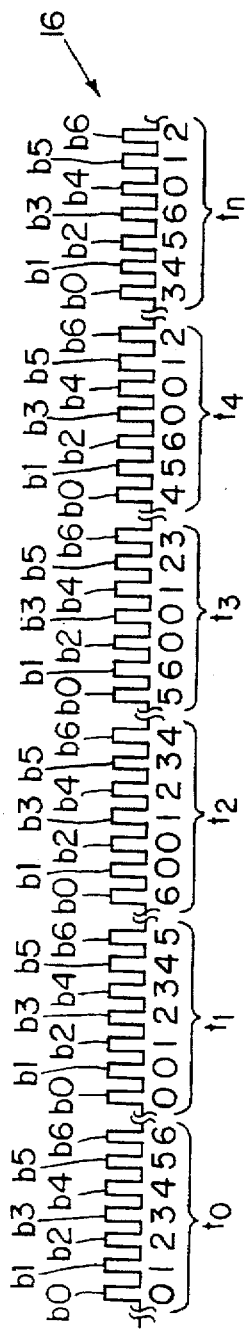
Figure 4F:
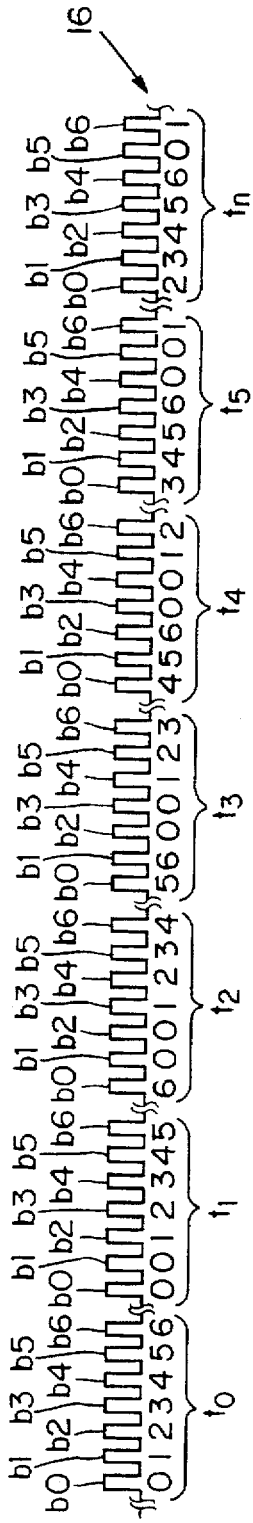
Figure 4G:
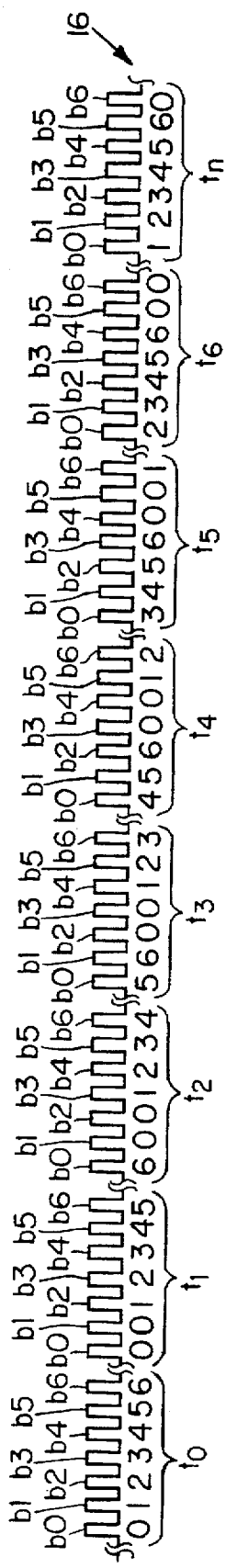

FIGS. 4A–4G illustrate the process of determining byte alignment in a preferred embodiment of the invention. The bitwise data stream from the CSU/DSU 10 is divided into 7-bit (b0, . . . ,b6) bytes based on clock ticks 16. Upon entering the learning sequence (FIG. 3, Step 6) at an arbitrary time $t_0$, an arbitrary bit position b0 is initially selected as a candidate byte boundary (i.e., bit 0 of the candidate byte). As shown in FIG. 4A, that bit position b0 is bit 0 of the candidate byte, the next sequential bit position b1 is bit 1 of the candidate byte, etc. If this candidate byte boundary is correct then, at a later time $t_n$, relative bit position b0 is also a byte boundary. In the more likely event that the initial candidate b0 does not delineate the correct byte alignment, the next sequential bit position b1 is selected as the next candidate bit position (FIG. 3, Step 5). As shown in FIG. 4B, the second bit position b1 is bit 0 of the candidate byte, the third bit position b2 is bit 1 of the candidate byte, etc. If this bit position b1 delineates the correct byte boundary then, at a later time $t_n$, that bit position b1 identifies the proper byte alignment. A similar process is repeated in FIGS. 4C-4G until the candidate bit b matches the correct byte alignment. Note that once the proper bit boundary is determined, that bit b remains bit 0 of the aligned byte at arbitrary later times $t_n$.

Returning to FIG. 3, with the determination of proper byte alignment complete, it is now possible to dial the remainder of the number at step 6 using DTMF dialing without further searching for byte alignment. The learning sequence can be performed anytime the circuit is in the idle mode. At step 7, the results are stored so that no iteration through the learning sequence is required for subsequent dialing. Once the proper byte alignment has been acquired and stored, that alignment can be used to send byte aligned data into the switched digital network 20 in all phases of the call. This may be used to an advantage for transmission of network compatible digitized voice or digital data, but is not limited to those applications. For example, echo canceller disabler tones or analog modem signals can be transmitted using the determined byte alignment.

In addition to the basic functions performed by the CSU/DSU 10, the CSU/DSU 10 contains the necessary hardware and firmware to perform call progress detection, such as specified in U.S. Pat. No. 5,060,259. In addition, the CSU/DSU 10 contains hardware for generating the data streams that contain the digitally encoded representations of the DTMF digits. The CSU/DSU 10, in accordance with the present invention, also contains apparatus for initiating the tone generation on any of seven byte boundaries, for retaining the chosen byte boundary in memory 13, for specifying the DTMF tone transmitted, and for changing the specified byte boundary.

Figure 5:
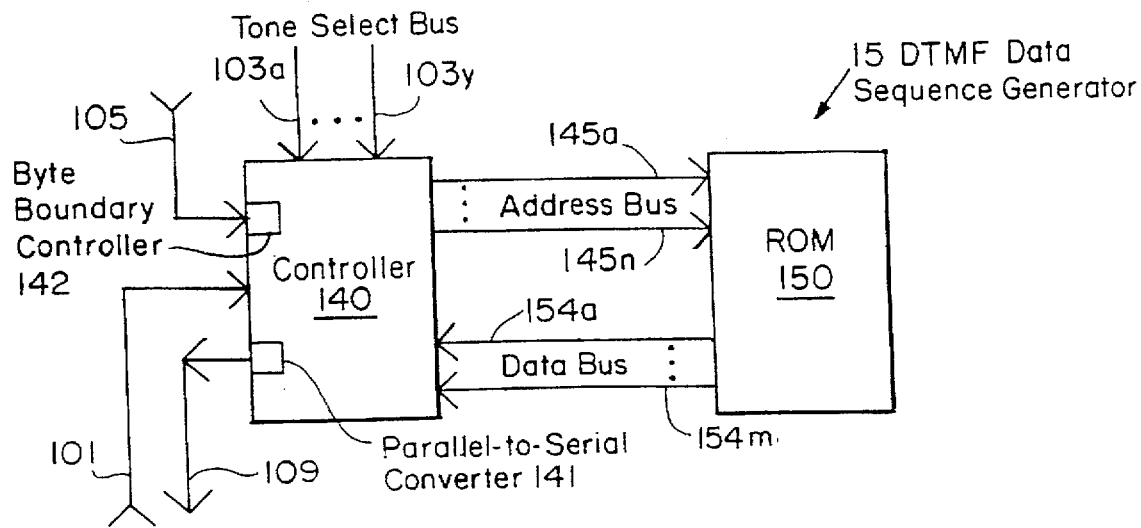
FIG. 5 is a block diagram illustrating a preferred DTMF data sequence generator 15, including control logic, of FIG. 1.

FIG. 5 is a block diagram illustrating a preferred embodiment of a DTMF data sequence generator 15 in accordance with the invention. Counters and control logic 140 control the data present on an m-bit data bus 154a-154m of read-only memory (ROM) 150. The control logic 140 transmits an address to the ROM 150 over an n-bit address bus 145a-145n. The ROM 150 has been programmed with p-law encoded digital representations of DTMF signals. The tones are returned to the control logic 140 on the m-bit data bus 154a-154m as digital representations of the tones. In a preferred embodiment, there are eight data bits, so m=8. An x-bit tone select bus 103a-103x directs control logic 140 to address the different tones stored within the ROM 150.

Within the control logic 140 is a circuit 141 that converts the parallel represented data in the ROM 150 into a serial synchronous data output stream 109. The data output stream 109 is suitable for transmission into the switched network 20.

Within the control logic 140 is another circuit 142 that controls the byte boundary for transmission of DTMF tones. The selected byte boundary remains constant unless changed by stimulus from the CSU/DSU 10 on data line 105.

The above and other functions of the invention can also be implemented using Programmable Gate Arrays.

Equivalents

Those skilled in the art will know, or be able to ascertain, using no more than routine experimentation, many equivalents to the specific embodiments of the invention described herein. These and all other equivalents are intended to be encompassed by the following claims.

The invention claimed is:

1. A service unit for a communication system comprising:
   a call initializer to interconnect the service unit with a digital network having a call progress capability and a network byte alignment;
   a byte aligner to determine the network byte alignment of the digital network using the call progress capability; and
   a call connector to address a remote called node using the determined network byte alignment.

2. The service unit according to claim 1 wherein the call initializer transmits a data pattern from the service unit to the digital network.

3. The service unit according to claim 2 wherein the data pattern is a mark hold pattern.

4. The service unit according to claim 1 wherein the digital network includes a direct digital access (DDA).

5. The service unit according to claim 1 wherein the byte aligner comprises:
   a bit selector to select a candidate byte alignment at a selected bit position;
   a transmitter to transmit a digital representation of a dual tone multi-frequency (DTMF) signal having the candidate byte alignment; and
   a detector to detect the presence or absence of a call progress response from the digital network, the presence of a call progress response indicating that the candidate byte alignment matches the network byte alignment.

6. The service unit according to claim 5 wherein the bit selector initially selects an arbitrary bit position as the candidate byte alignment.

7. The service unit according to claim 5 wherein the bit selector selects a sequential bit position on subsequent bit selections.

8. The service unit according to claim 5 wherein the transmitter transmits a DTMF signal corresponding to a subset of the address of the remote called node.

9. The service unit according to claim 5 wherein the detector recognizes a transition from a first type of signal returned from the digital network to a second type of signal returned from the digital network.

10. The service unit according to claim 1 wherein the communication system is a telephone system.

11. The service unit according to claim 1 wherein the digital network is a switched digital telephone network.

12. The service unit according to claim 11 wherein the switched digital telephone network operates at 64 kilobits per second.

13. The service unit according to claim 11 wherein the service unit is a switched service unit operating at 56 kilobits per second.

14. The service unit according to claim 1 further comprising a memory to store the determined network byte alignment for use subsequent to the interconnection of the service unit with the remote called node.

15. A system for generating a digital representation of a Dual Tone Multi-Frequency (DTMF) signal, comprising:

a tone select signal representing a selected DTMF signal;

a byte boundary select signal representing a selected byte boundary bit; and a controller for receiving the tone select signal and the byte boundary select signal and in response to the received signals transmitting a digital representation of the selected DTMF signal.

16. The system according to claim 15 further comprising a memory unit electrically connected to the controller and having stored therein digital representations of DTMF signals.

17. The system according to claim 16 wherein the controller is electrically connected to the memory unit by a parallel bus.

18. The system according to claim 17 wherein the memory unit includes Read-Only Memory.

19. The system according to claim 18 further comprising a parallel to serial converter to generate the digital representation of the selected DTMF signal.

20. The system according to claim 19 wherein the controller is formed from a programmable gate array.

21. A system for a communication system which includes a digital network, the system comprising:

a plurality of call progress signals received from the digital network; and a byte aligner to determine a boundary bit position of the bytes on the digital network in response to at least one received call progress signal.

22. The system according to claim 21 wherein the byte aligner comprises:

a bit selector to select a candidate bit position;

a transmitter to transmit a digital representation of an analog signal aligned at the candidate bit position; and a detector to detect the presence or absence of a call progress response from the digital network, the presence of a call progress response indicating that the candidate bit position matches the boundary bit position.

23. The system according to claim 22 wherein the analog signal is a dual tone multi-frequency (DTMF) signal.

24. The system according to claim 22 wherein the transmitter transmits a digital representation of an analog signal which corresponds to a subset of the address of the remote called node.

25. The system according to claim 21 further comprising a memory to store the determined boundary bit position for a subsequent use.

26. An apparatus for a communication system which includes a digital network, the apparatus comprising:

a byte aligner to determine a boundary bit position of the bytes on the digital network, the byte aligner comprising:

a bit selector to select a candidate bit position;

a transmitter to transmit a digital representation of an analog signal aligned at the candidate bit position; and a detector to detect the presence or absence of a call progress response from the digital network, the presence of a call progress response indicating that the candidate bit position matches the boundary bit position.

27. The apparatus according to claim 26 wherein the analog signal is a dual tone multi-frequency (DTMF) signal.

28. The apparatus according to claim 26 wherein the transmitter transmits a digital representation of an analog signal which corresponds to a subset of the address of the remote called node.

29. The apparatus according to claim 26 further comprising a memory to store the determined boundary bit position for a subsequent use.

* * * * *